United States Patent [19]
Kitamura et al.

[11] Patent Number: 5,337,543
[45] Date of Patent: Aug. 16, 1994

[54] LAWN MOWER FOR USE BOTH AS RIDING AND WALKING OPERATOR TYPE

[75] Inventors: Junichi Kitamura; Hirofumi Sadakane; Yoshio Tomiyama, all of Sakai, Japan

[73] Assignee: Kubota Corporation, Osaka, Japan

[21] Appl. No.: 874,647

[22] Filed: Apr. 27, 1992

[30] Foreign Application Priority Data

Oct. 4, 1991 [JP] Japan .................. 3-257322

[51] Int. Cl.⁵ .............................. A01D 34/00
[52] U.S. Cl. .................... 56/10.8; 56/17.5; 56/14.8
[58] Field of Search .......... 56/1, 2, 7, 12.7, 10.8, 56/14.8, 16.7, 17.5, 252, 320.1, DIG. 7, DIG. 9, DIG. 13, DIG. 22

[56] References Cited

U.S. PATENT DOCUMENTS

| | | | |
|---|---|---|---|
| 3,085,387 | 4/1963 | Harper | 56/16.7 |
| 3,729,908 | 5/1973 | Miner | 56/16.7 |
| 4,429,515 | 2/1984 | Davis et al. | 56/DIG. 22 X |
| 4,934,989 | 6/1990 | Furukawa et al. | 474/135 |
| 4,957,183 | 9/1990 | Mullett et al. | 56/DIG. 22 X |
| 5,090,512 | 2/1992 | Mullett et al. | 56/DIG. 22 X |
| 5,137,100 | 8/1992 | Scott et al. | 56/DIG. 11 X |
| 5,138,825 | 8/1992 | Trefz et al. | 56/DIG. 22 X |
| 5,239,810 | 8/1993 | Gugel | 56/17.5 X |

*Primary Examiner*—Roger J. Schoeppel
*Attorney, Agent, or Firm*—Webb Ziesenheim Bruening Logsdon Orkin & Hanson

[57] ABSTRACT

A lawn mower for use both as walking operator type and riding type, having a grass cutting unit, an engine located rearwardly thereof, a driver's seat located above the engine, a floor step located over the grass cutting unit to be movable between an open position and a closed position, and right and left rear wheels driven by the engine. The rear wheels have respective stepless transmissions operable independently of each other to transmit engine drive in different speeds to the rear wheels. These transmissions are operable by shift levers located on opposite sides of the driver's seat when the lawn mower is used as the riding type, and by control levers extending rearwardly of the driver's seat when the lawn mower is used as the walking operator type.

17 Claims, 6 Drawing Sheets

LAWN MOWER FOR USE BOTH AS RIDING AND WALKING OPERATOR TYPE

BACKGROUND OF THE INVENTION

1. Field of the Invention

The present invention relates to a lawn mower controllable by a driver riding the mower or walking behind the mower.

2. Description of the Related Art

A riding type lawn mower, as disclosed in U.S. Pat. No. 4,957,183, has an engine mounted on a front portion of a vehicle body, a driver's section disposed rearwardly, and a grass cutting unit underslung between front and rear wheels. The mower runs on the wheels driven respectively by hydraulic motors, and is steerable by turning the wheels up to about 90 degrees with a steering wheel disposed in the center and forwardly of a driver's seat.

The riding type lawn mower having the above construction is capable of a small, sharp turn with the center of turning moved to a position inwardly of a peripheral edge of the grass cutting unit. This turning capability provides the advantage of realizing an efficient grass cutting operation leaving no uncut patches. However, since the engine is mounted forwardly of the driver's section, the mower has an extensive fore and aft length. Consequently, the driver has difficulties in observing grass patches ahead of the mower during a grass cutting run. In addition, when boarding and alighting from the mower, the driver has the inconvenience of having to move through a narrow space between the driver's seat and steering wheel.

In the case of walking operator type lawn mower, one known example, as disclosed in U.S. Pat. No. 4,934,989, has a grass cutting unit mounted between caster type front wheels and engine-driven rear wheels, and control levers extending rearwardly for a walking operator to steer the mower. This lawn mower is easily controllable by operating transmission clutches provided for the rear wheels, respectively. It is possible to drive the mower along a complicated curve to engage in a grass cutting operation. However, when the mower is caused to run along a long straight line, the operator must follow the mower in a tedious walk. The walking operator type lawn mower has a low reputation for use in an operation involving such long straight walks.

SUMMARY OF THE INVENTION

The object of the present invention is to provide a lawn mower controllable by a driver riding the mower or walking behind the mower, which eliminates the drawbacks of the riding type and walking operator type lawn mowers noted above.

The above object is fulfilled, according to the present invention, by a lawn mower for use both as walking operator type and riding type, comprising:

a chassis frame;
an engine mounted on a rearward position of the chassis frame;
at least one front wheel;
driven rear wheel means;
transmission means for transmitting drive from the engine to the rear wheel means, the transmission means including change speed means for changing speed of the rear wheel means;
a grass cutting unit suspended from the chassis frame;
a driver's seat disposed above the engine; and
control means operable from a position rearwardly of the chassis frame when the lawn mower is used as walking operator type, and from the driver's seat when the lawn mower is used as riding type, for controlling at least the change speed means.

According to the above construction, the engine and driver's seat which occupy large spaces in the fore and aft direction of the vehicle body are arranged to overlap each other vertically, thereby reducing the fore and aft length of the vehicle body. Further, the distance from the driver's seat to the front end of the vehicle body is minimized since no large components are mounted on a forward portion of the chassis. The change speed means is operable both when the driver is walking behind the mower and when the driver is riding the mower. Thus, where the right and left rear wheels are driven separately, steering control and running speed control may be effected in the two driving modes.

In a preferred embodiment of the invention, the rear wheel means includes a right rear wheel and a left rear wheel, and the change speed means includes a right transmission and a left transmission for driving the right and left rear wheels, respectively, the control means being operable to provide a steering control by controlling the transmissions to differentiate speed of the right and left rear wheels. In this case, the mower may be caused to make a small, sharp turn about an intermediate position between the right and left rear wheels, thereby minimize uncut patches of grass left due to the turnabout of the mower. The control means may comprise right and left shift levers disposed on opposite sides of the driver's seat. This provides the advantage of presenting no obstacle forwardly of the driver's seat to inconvenience the driver in boarding and alighting from the mower.

The lawn mower according to the present invention has a very compact construction instead of just being usable as the walking operator type and riding type. This mower is easy to handle for driver walking behind it, and allows the driver in either driving mode to have an excellent view of the ground forwardly of the mower.

Other features and advantages of the present invention will be apparent from the following description of the preferred embodiment of the invention taken with reference to the accompanying drawings.

DETAILED DESCRIPTION OF THE PREFERRED EMBODIMENT

An embodiment of the present invention will be described hereinafter with reference to the drawings.

Figure 1:
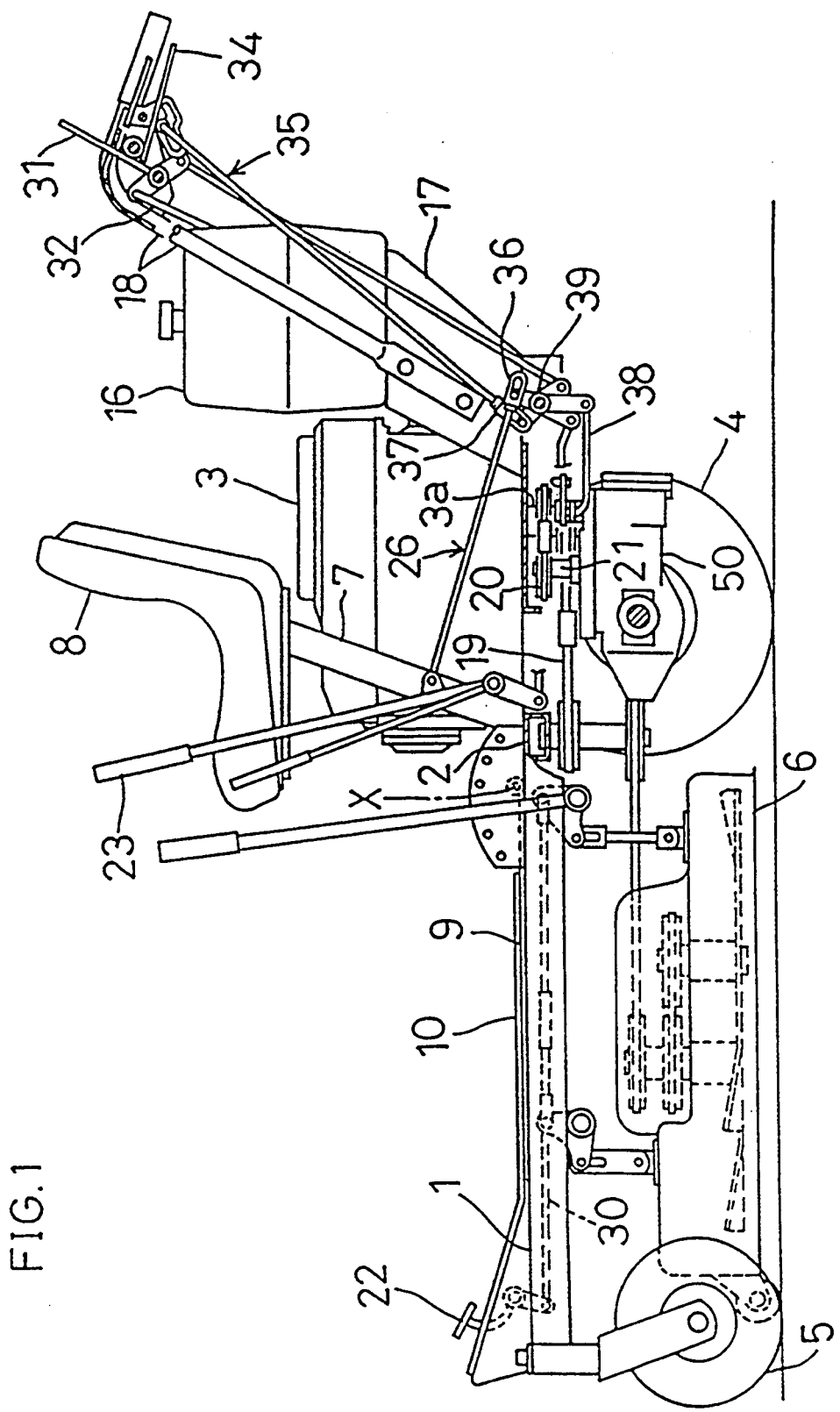
FIG. 1 is a side elevation of a lawn mower equipped with a transmission system according to the present invention.
Figure 2:
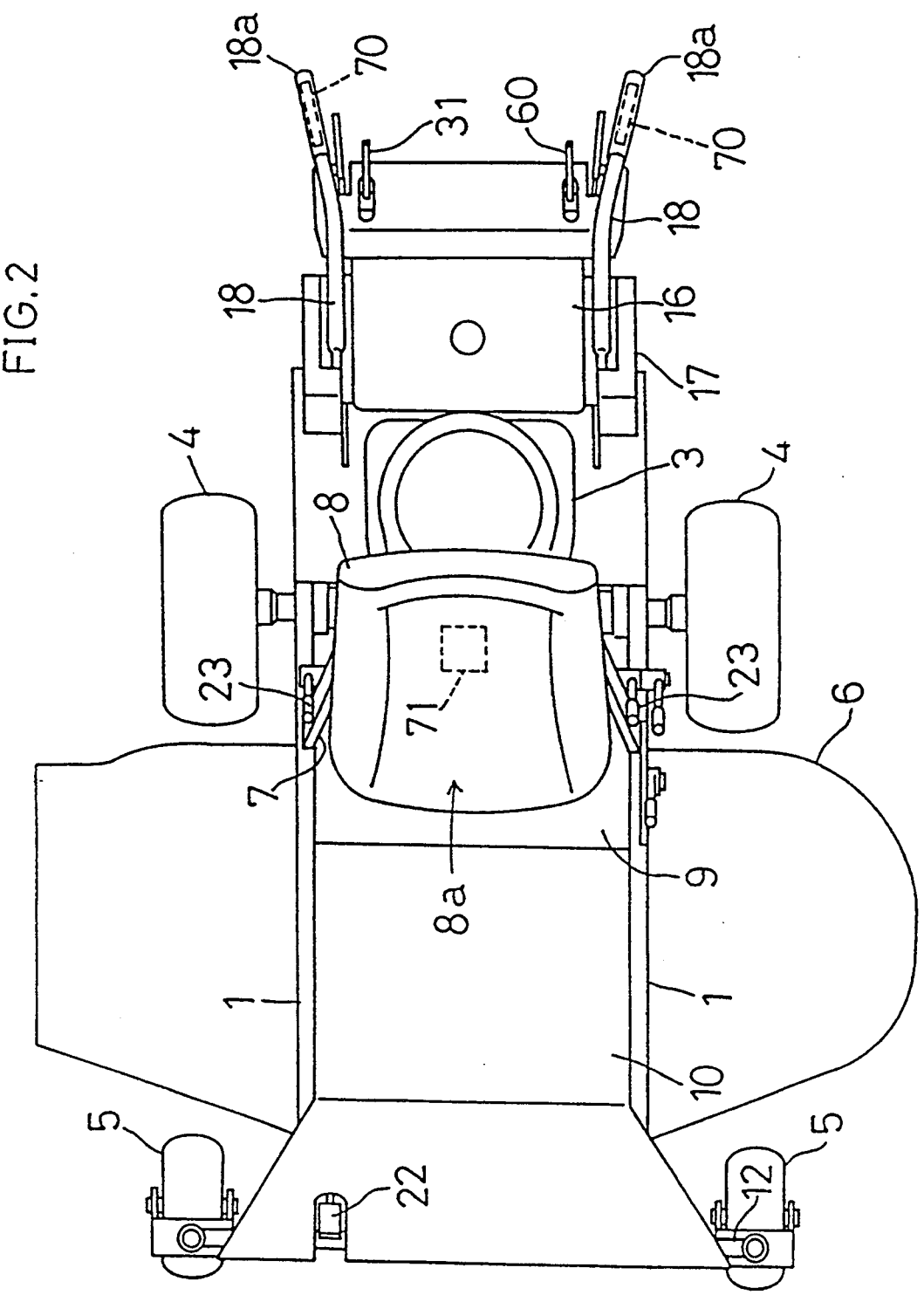
FIG. 2 is a plan view of the lawn mower shown in FIG. 1.

FIGS. 1 and 2 show a lawn mower controllable by a driver riding the mower or walking behind the mower. This lawn mower has a pair of right and left chassis frames 1 extending longitudinally thereof, and an engine supporting frame 2 extending between the chassis frames 1 for supporting an engine 3. Right and left rear wheels 4 are disposed below the engine 3, and caster type right and left front wheels 5 are disposed at forward ends of the chassis frames 1, respectively. A grass cutting unit 6 is underslung between the front wheels 5 and rear wheels 4. The rear wheels 4 have respective hydrostatic transmissions 50 mounted below the engine 3 and having output shafts coaxial with axles of the rear wheels 4. Thus, the rear wheels 4 are driven by the hydrostatic transmissions 50 independently of each other. The front wheels 5 are formed as free rotation wheels oscillatable about respective vertical axes.

Figure 3:
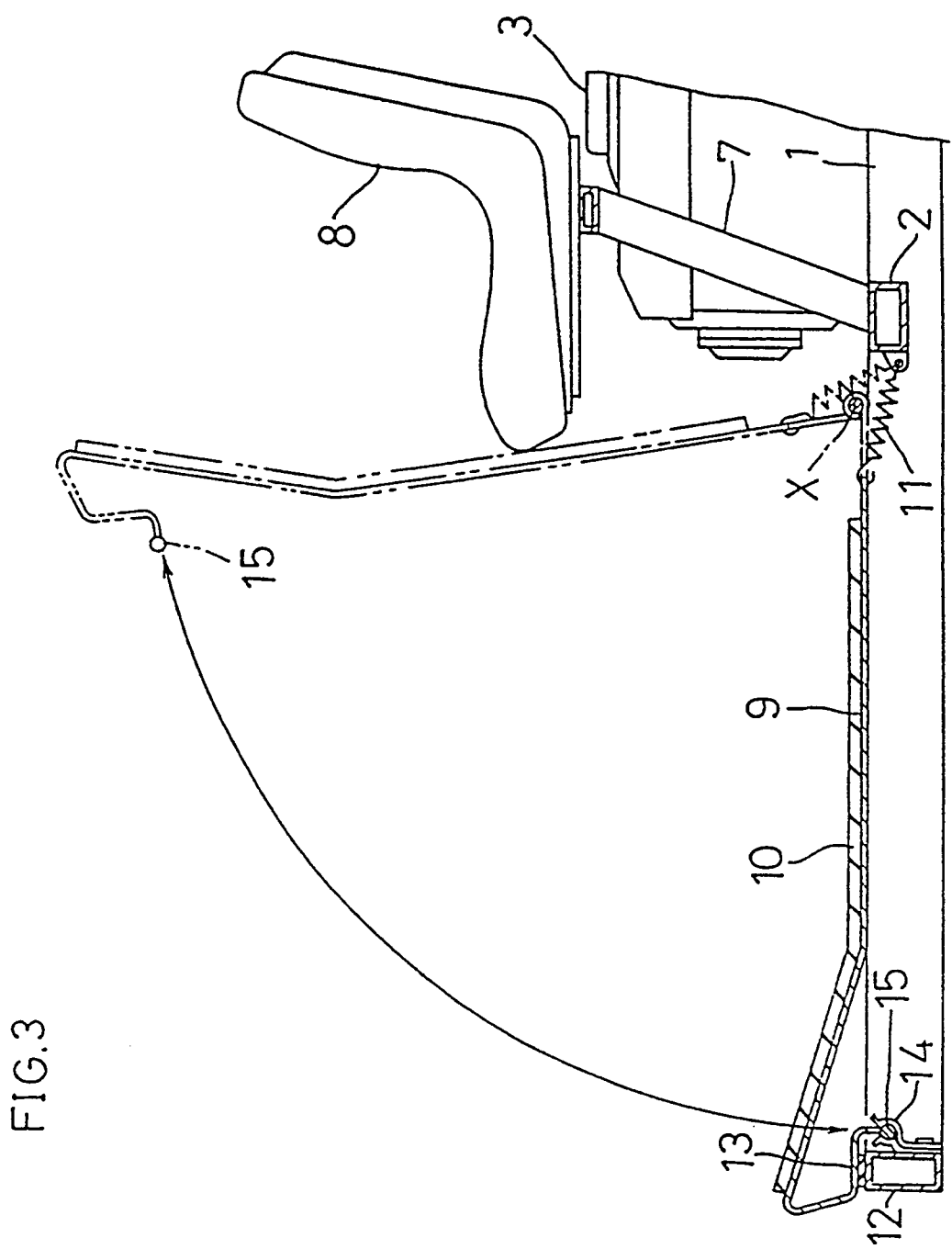
FIG. 3 is a side view of a driver's section.

The right and left chassis frames 1 support a gate-shaped support frame 7 extending over the engine 3 and supporting a driver's seat 8 thereon. When this lawn mower is used as the riding type, the driver is seated on the seat 8 disposed in a space above the engine 3. A floor step 9 is provided forwardly of the driver's seat 8 and over the grass cutting unit 6. The floor step 9 extends over an entire width between the right and left chassis frames 1, covering an area over the grass cutting unit 6. A nonslip rubber sheet 10 is placed on an upper surface of the floor step 9. The floor step 9 and driver's seat 8 define a riding control space for the driver. The floor step 9 is pivotable about a rear transverse axis X thereof between an operative or closed position covering the area over the grass cutting unit 6, and an open position revealing the grass cutting unit 6 upwardly. Opening of the floor step 9 facilitates maintenance and the like of a transmission system for driving the grass cutting unit 6. Specifically, as shown in FIG. 3, the floor step 9 is connected at a rear end thereof to the chassis frames 1 to be pivotable about the transverse axis X. The floor step 9 is biased by toggle springs 11 to the closed position and to the open position to assure safety of maintenance work. The floor step 9 has a free forward end supported by the chassis frames 1 through vibration proofing rubber elements 13, and retained in place by spring clamps 14 elastically engaging portions of the forward end. This supporting structure checks transmission of vibrations occurring during a run.

This lawn mower provides an area rearwardly thereof for the driver to walk and control behind the mower. Specifically, a fuel tank 16 is erected on a support member 17 rearwardly of the engine supporting frame 2, and a pair of right and left handle bars 18 extend upwardly and rearwardly from opposite sides of the support member 17. The driver may be seated comfortably on the driver's seat 8 in a grass cutting operation on a level ground, and may alight from the mower and control the mower while walking behind it in an operation on a sloping ground or when moving the mower over a ridge. Thus, the lawn mower may be operated with ease according to working conditions.

Figure 4:
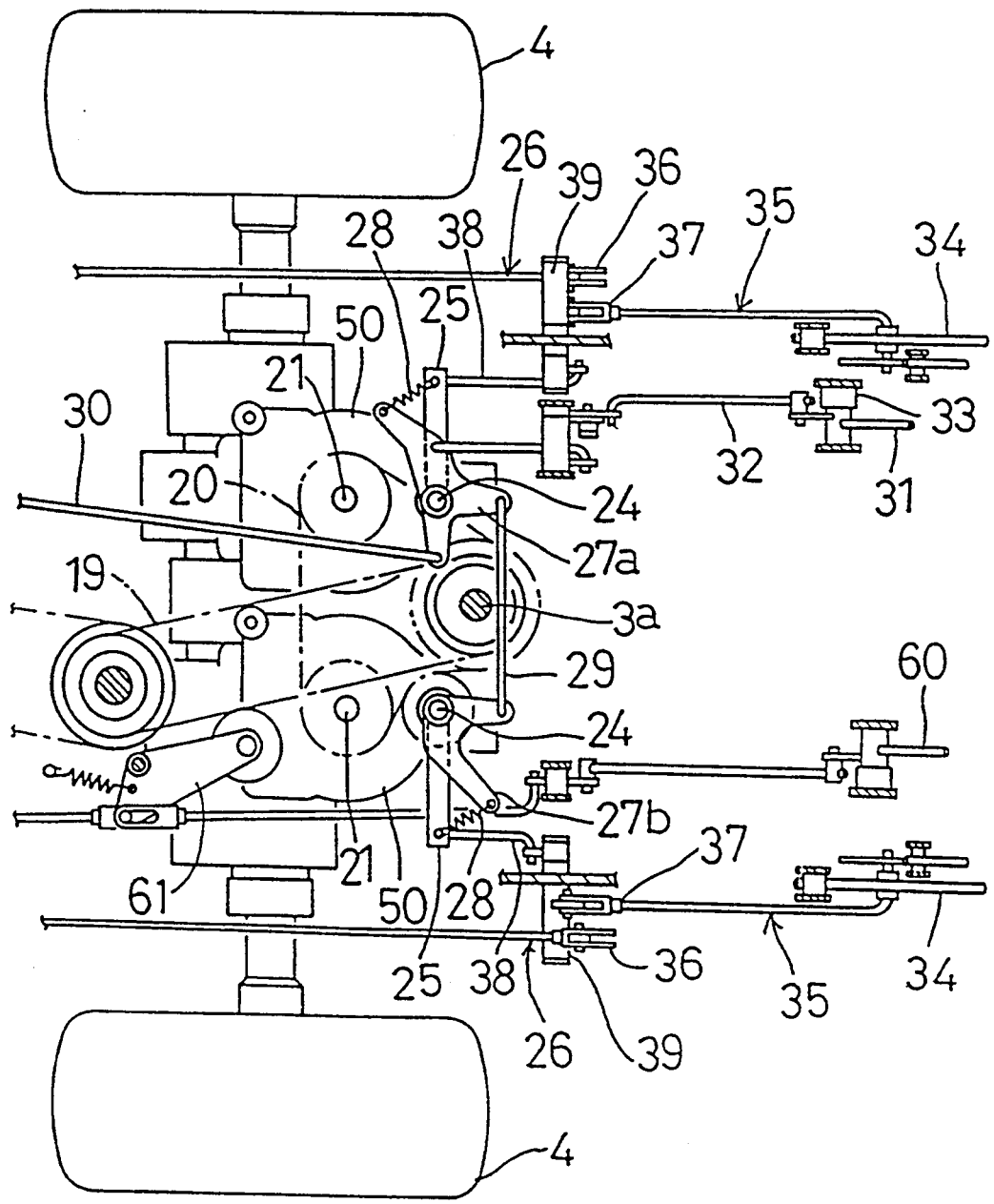
FIG. 4 is a plan view of a transmission system.
Figure 5:
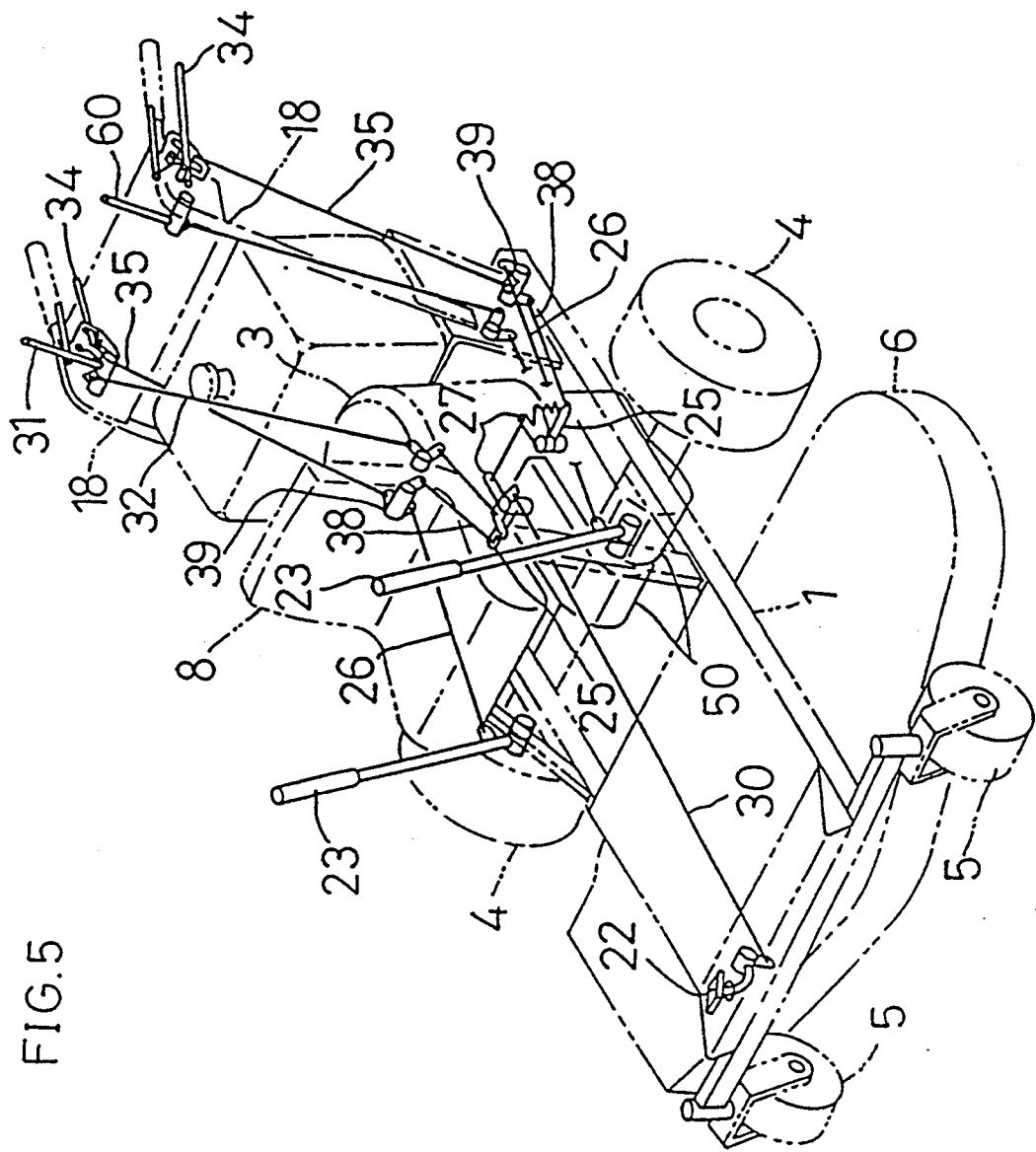
FIG. 5 is a perspective view of a control mechanism for controlling the transmission system.

The transmission system transmits drive from a vertical output shaft 3a of the engine 3 to the grass cutting unit 6 through a transmission belt 19, and to input shafts 21 of the respective hydrostatic transmissions 50 through a different transmission belt 20. Both of the hydrostatic transmissions 50 are likewise shiftable from neutral to a forward speed position by depressing a control pedal 22 provided on the floor step 9. From the forward speed position set by the control pedal 22, the hydrostatic transmissions 50 are individually shiftable to a different speed position, such as a backward speed position, by operating shift levers 23 disposed on opposite sides of the driver's seat 8. More particularly, as shown in FIGS. 4 and 5, each of the hydrostatic transmissions 50 has a speed control shaft 24 carrying a change speed arm 25 interlocked with one of the shift levers 23 through a link mechanism 26. A control arm 27a or 27b is supported to be pivotable about the same axis as and relative to the change speed arm 25. The control arm 27a or 27b and change speed arm 25 are interlocked through a tension spring 28, so that the change speed arm 25 follows pivotal movement of the control arm 27a or 27b.

The two control arms 27a and 27b are interlocked through a connecting rod 29 to be pivotable in unison. The control arm 27a is interlocked with the control pedal 22 through a link mechanism 30. In this embodiment, the control arms 27a and 27b are pivotable within a limited range so that the change speed arms 25 are pivotable within a range of displacement from neutral to a forward speed region. In other words, this limited range prohibits a shift for backward drive as a result of depression of the control pedal 22. The control pedal 22 is constantly biased by a spring to return to neutral. Each shift lever 23 is pivotable backward through an operating range to shift the change speed arm 25 against the force of the tension spring 28 to slow down forward drive and further to provide backward drive.

In a normal grass cutting operation, a maximum forward speed for straight running is set by depressing the control pedal 22 and, when necessary, the speed of the right and left rear wheels 4 is differentiated by operating one or both of the right and left shift levers 23 to turn round the lawn mower. When desired, one of the rear wheels 4 may be driven backward while the other is driven forward, to cause the mower to make a small, sharp turn about an intermediate position between the right and left rear wheels 4. Such a small, sharp turnabout of the mower has the advantage of reducing patches of grass left uncut.

Figure 6:
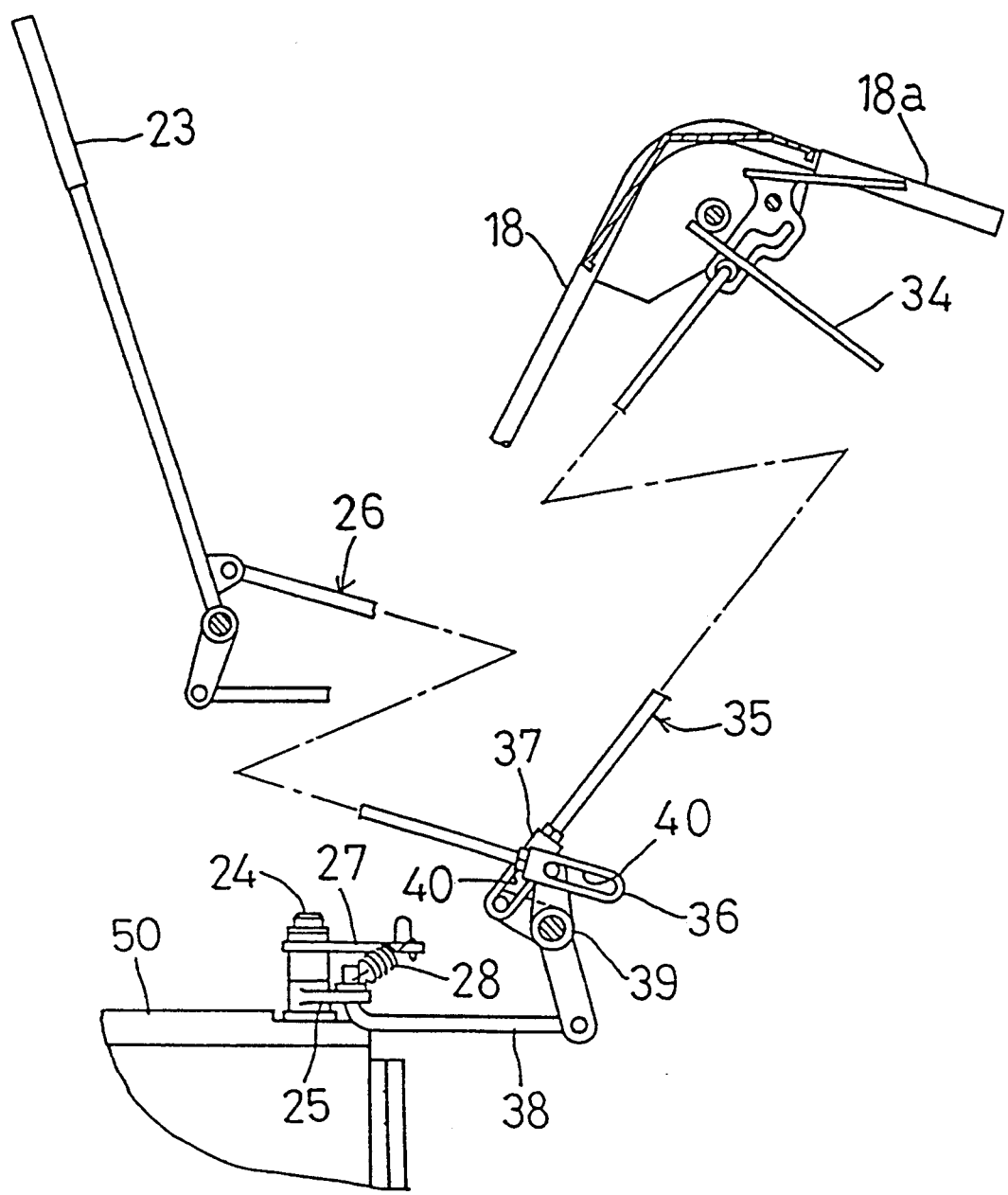
FIG. 6 is an enlarged side view of a portion of the control mechanism.

The control arms 27a and 27b are operable also by a speed setting lever 31 disposed in the rearward area for the operator to walk and control the mower. One of the control arms 27a is interlocked with the speed setting lever 31 through a link mechanism 32. The link mechanism 32 includes a disk spring type retaining mechanism 33 provided in an intermediate position thereof for retaining the speed setting lever 31 in a selected control position. The change speed arms 25 are operable also by right and left grip levers 34 provided in the rearward area. That is, the change speed arms 25 and grip levers 34 are interlocked through link mechanisms 35, respectively. Play is provided in a connection so that, when one of the grip levers 34 in the rearward area is operated, the shift lever 23 on the same side in the riding driver's section remains still. This allows a gripping operation to be effected with ease. Specifically, as shown in FIG. 6, a pivotable element 39 interlocks a link 36 connected to the shift lever 23, a link 37 connected to the grip lever 34, and a link 38 connected to the change speed arm 25. Each of the link 36 connected to the shift lever 23 and the link 37 connected to the grip lever 34 defines a slot 40 extending along a direction of pivotal movement of the pivotable element 39. Thus, when the grip lever 34 is gripped with the handle bar 18 to provide backward drive, the link 36 connected to the shift lever 23 remains inoperative because of the slot 40.

Numeral 60 in FIG. 4 denotes a control lever for operating a tightener type clutch 61 for breaking drive transmission to the grass cutting unit 6. Though not shown in the drawings, this clutch 61 is operable also by the driver riding the mower.

Engine stopper switches 70 and 71 are provided for each handgrip 18a in the rearward control area and in a seat base 8a of the driver's seat 8 in the riding control area. The switch 70 and 71 is turned off to stop the engine 3 for safety assurance when the driver leaves the seat 8 or releases one of the handgrips 18a.

The lawn mower having the described construction includes no large components such as a steering wheel or a steering column, to allow the driver to board and alight from the mower with ease. With an open space above the floor step 9, the driver has a clear view of positions forwardly of the mower, which enables an efficient grass cutting operation.

What is claimed is:

1. A lawn mower for use both as walking operator type and riding type, comprising:
   a chassis frame;
   an engine mounted on a rearward position of said chassis frame;
   at least one front wheel;
   a driven rear wheel means, said rear wheel means including a right rear wheel and a left rear wheel;
   a transmission means for transmitting drive from said engine to said rear wheel means, said transmission means including change speed means for changing speed of said rear wheel means, said change speed means including a right transmission and a left transmission for independently driving said right and left rear wheels, respectively;
   a grass cutting unit suspended from said chassis frame;
   a driver's seat disposed above said chassis frame; and
   a control means operable from a position rearwardly of said chassis frame when the lawn mower is used as walking operator type, and from said driver's seat when the lawn mower is used as riding type, for controlling at least said change speed means, said control means including a front control unit operable from said driver's seat, said front control unit including a control pedal on said chassis frame coupled to both said right and left transmissions configured to shift said right and left transmissions from neutral to a driving position, and right and left shift levers disposed on opposite sides of a centerline of said chassis frame coupled to said right and left transmissions, respectively, wherein each said right and left transmission is individually shiftable from said driving speed to a different driving speed by said shift level to which it is coupled.

2. A lawn mower as claimed in claim 1, wherein said control means includes a rear control unit operable similarly to said front control unit to control said right and left transmissions, said rear control unit being operable from said position rearwardly of said chassis frame.

3. A lawn mower as claimed in claim 1, wherein said transmissions are hydrostatic transmissions disposed below said chassis frame and coaxially with axles of the respective rear wheels.

4. A lawn mower as claimed in claim 3, wherein each said hydrostatic transmission includes a speed control shaft, and said control means includes a change speed arm positioned on each said speed control shaft, a link mechanism coupling each said change speed arm to a respective one of said shift levers, a control arm positioned on each said speed control shaft, a connecting rod interconnecting said control arms of said right and left hydrostatic transmissions, wherein said control arms operate in unison, and a link mechanism coupling said control pedal with one of said control arms.

5. A lawn mower as claimed in claim 4, wherein said control arms are pivotable within a limited range of motion, whereby said limited range of motion provides that said driving position is a forward speed position.

6. A lawn mower as claimed in claim 5, wherein said different speed may be a backward driving speed.

7. A lawn mower as claimed in claim 4, wherein said control means further includes a spring means for biasing each said control arm to a neutral position.

8. A lawn mower as claimed in claim 4, wherein said control means includes a rear control unit operable similarly to said front control unit to control said right and left hydrostatic transmissions, said rear control unit being operable from said position rearwardly of said chassis frame.

9. A lawn mower as claimed in claim 8, wherein said rear control unit includes a speed setting lever coupled to one of said control arms through a link mechanism.

10. A lawn mower as claimed in claim 9, wherein said link mechanism coupling said speed setting lever to one of said control arms further includes a retaining means for retaining said speed setting lever in a selected control position.

11. A lawn mower as claimed in claim 9, wherein said rear control unit further includes right and left grip levers interconnected to a respective one of said change speed arms through link mechanisms, to operate said respective change speed arms.

12. A lawn mower as claimed in claim 11, wherein said link mechanisms coupling each said grip levers to said respective change speed arms provide for control of said change speed arms without movement of said shift lever to which said change speed arm is coupled.

13. A lawn mower as claimed in claim 11, further including engine stopper switches provided on each said handgrip and in a seat base of said driver's seat.

14. A lawn mower for use both as walking operator type and riding type, comprising:
   a chassis frame;
   an engine mounted on a rearward portion of said chassis frame;
   at least one front wheel;
   a driven rear wheel means;
   transmission means for transmitting drive from said engine to said rear wheel means, said transmission means including change .speed means for changing speed of said rear wheel means;
   a grass cutting unit suspended from said chassis frame;
   a driver's seat disposed above said chassis frame, wherein said grass cutting unit is disposed forwardly of and below said driver's seat and between said front wheel and said rear wheel means;
   a floor step supported on said chassis frame to be movable between a first position for covering an upper region of said grass cutting unit forwardly of said driver's seat, and a second position for revealing said upper region of said grass cutting unit; and
   a control means operable from a position rearwardly of said chassis frame when the lawn mower is used as walking operator type, and from said driver's seat when the lawn mower is used as riding type, for controlling at least said change speed means.

15. A lawn mower as claimed in claim 14, further including a nonslip rubber sheet positioned on an upper surface of said floor step.

16. A lawn mower as claimed in claim 14, further including a toggle spring coupled to said chassis frame and said floor step, wherein said toggle spring is configured to bias said floor step toward said first position when said floor step is in said first position and to bias said floor step toward said second position when said floor step is in said second position.

17. A lawn mower as claimed in claim 14, further including rubber elements coupled to said frame supporting a free forward end of said floor step.

* * * * *

UNITED STATES PATENT AND TRADEMARK OFFICE
CERTIFICATE OF CORRECTION

PATENT NO. : 5,337,543
DATED : August 16, 1994
INVENTOR(S) : Junichi Kitamura, Hirofumi Sadakane and Yoshio Tomiyama It is certified that error appears in the above-indentified patent and that said Letters Patent is hereby corrected as shown below:

Column 1 Line 45 "i s" should read --is--.

Column 2 Line 1 "engine:" should read --engine;--.

Column 2 Line 56 "system." should read --system,--.

Claim 1 Line 51 Column 5 "level" should read --lever--.

Signed and Sealed this

Twenty-fifth Day of October, 1994

Attest:

BRUCE LEHMAN

Attesting Officer

Commissioner of Patents and Trademarks